Patented Mar. 26, 1940

2,195,390

UNITED STATES PATENT OFFICE 2,195,390

AZO DYESTUFFS AND FIBER DYED THEREWITH

George Holland Ellis and Henry Charles Olpin, Spondon, near Derby, England

No Drawing. Application August 30, 1939, Serial No. 292,568. In Great Britain July 13, 1938

16 Claims. (Cl. 260—163)

This invention relates to the manufacture and application of new azo dyes, and particularly water-soluble dyes which are suitable for the colouration of cellulose acetate and other cellulose ester and ether materials.

According to the present invention new azo dyes are obtained by coupling diazo compounds with pyrazolone coupling components, at least one of the two components containing a hydroxy-alkyl group, the hydroxyl group of which is esterified to an acid ester of a polybasic acid, for example sulphuric acid. The term "polybasic acid" is used as including dibasic acids.

The new dyes are thus pyrazolone azo dyes containing a hydroxyalkyl group, the hydroxy group of which is esterified to an acid ester of a polybasic acid. The dyes are, either as free acids or in the form of salts, soluble in water. Moreover, such of them as are free from sulphonic or carboxylic groups (including sulphonic or carboxylic groups combined with bases to form salts) and contain but a single hydroxyalkyl group esterified to an acid ester with a polybasic acid are valuable dyes for cellulose acetate.

The esterified hydroxyalkyl group is advantageously attached to the dyestuff nucleus through an oxygen atom or through a nitrogen atom, that is to say, the esterified hydroxyalkyl group is present as a hydroxy-alkoxy group or a hydroxy-alkylamino group, the hydroxy group of which is esterified to an acid ester of a polybasic acid.

The polybasic acid of which the new dyes are acid esters is with advantage sulphuric acid as described above and the acid sulphuric esters of hydroxyalkyl compounds are hereinafter referred to as sulphato-alkyl compounds. The acid can, however, be another polybasic acid and particularly an inorganic acid, for example phosphoric acid or phosphorous acid, or an acid ester of an inorganic acid, the said ester containing at least two acidic hydrogen atoms. Examples of acid esters of the latter type are the mono-alkyl esters of phosphoric acid.

The diazo compounds containing esterified hydroxy-alkyl groups are preferably of the benzene series. Suitable compounds are those obtainable by diazotising sulphato-ethoxy aniline and nuclear substitution products thereof, for example 4-(sulphato-ethoxy)-aniline and its 2-chlor or 2- or 3-methyl derivatives. Again, diazotised sulphato-alkylamino-anilines can be used, for example 1-amino-4-ethyl-sulphato-ethyl-amino-benzene.

These can be used to couple, for example, with 1-phenyl-3-methyl-5-pyrazolone, 1-naphthyl-3-methyl-5-pyrazolone, 1-phenyl-5-pyrazolone-3-carboxylic ethyl ester and 1:3-dimethyl-5-pyrazolone.

Suitable pyrazolones containing hydroxyalkyl groups esterified to acid esters of polybasic acids are 1-aryl-5-pyrazolones containing sulphato-alkoxy groups as substituents in the aryl nuclei. Mention may be made, for instance, of 1-(p-sulphato-ethoxy phenyl)-3-methyl-5-pyrazolone, 1-(p-sulphato-ethoxy)-5-pyrazolone-3-carboxylic ethyl ester and 1-(4'-sulphato-ethoxy-3'-methylphenyl)-3-methyl-5-pyrazolone.

These pyrazolones containing esterified hydroxyalkyl groups can be coupled with diazo compounds from aniline, toludidines, anisidines, or their halogen or nitro derivatives.

As indicated above, both diazo component and pyrazolone coupling component may contain a hydroxy-alkyl group esterified to an acid ester of a polybasic acid if desired. Particularly useful, however, are the dyes obtainable by coupling diazo compounds of sulphato-alkoxy derivatives of anilines and their nuclear alkyl, alkoxy and halogen derivatives with 1:3-di-alkyl-, 3-alkyl- and 1-aryl-3-alkyl-5-pyrazolones and 1-aryl-5-pyrazolone-3-carboxylic esters, of which the aryl group of the pyrazolone, if present, is of the benzene series, is free from sulphonic and carboxylic groups, and is preferably a phenyl group or a phenyl group carrying a substituent selected from alkyl, alkoxy and halogen. Another useful group of dyes of the present invention are those obtainable by coupling diazo benzene or its nuclear alkoxy, alkyl or halogen derivatives with a 1-aryl-3-alkyl-5-pyrazolone or a 1-aryl-5-pyrazolone-3-carboxylic ester of which the aryl group carries a sulphato-alkoxy group as a substituent, is free from sulphonic and carboxylic groups, and is preferably either phenyl or phenyl carrying a substituent selected from alkyl, alkoxy, and halogen.

These two groups of dyes dye cellulose acetate in very desirable yellow shades of excellent fastness properties. Hitherto water-soluble dyes, satisfactory for the production of such shades on cellulose acetate or other cellulose ester or ether materials have been rare.

As examples of specific dyes falling within the scope of the present application, mention is made of the dye from diazotized p-(sulphato-alkoxy)-aniline and 1-phenyl-3-methyl-5-pyrazolone, and of the dye from diazo benzene and 1-(p-sulphato-alkoxy-phenyl)-3-methyl-5-pyrazolone.

According to a further feature of the invention the new dyes are also obtained by esterifying the corresponding hydroxyalkylated dyes to acid esters of polybasic acids. For example the two specific dyes mentioned above can readily be obtained by the action of sulphuric acid on the corresponding hydroxyalkylated dyes, that is upon the respective dyes p-hydroxy-ethoxy-benzene-azo-1-phenyl-3 - methyl - 5 - pyrazolone and benzene-azo-1-(p-hydroxy-ethoxy-phenyl)-3-methyl-5-pyrazolone.

Esterification of the hydroxylated dyes to acid sulphuric esters is generally very readily effected by the action of concentrated sulphuric acid. Usually it is sufficient to dissolve the dye in cold concentrated sulphuric acid and allow to stand for several hours, e. g. over night.

Esterification to an acid sulphuric ester can be effected, however, in other ways, e. g. with chlorsulphonic acid, fuming sulphuric acid, or sulphur trioxide. Chlorsulphonic acid and sulphur trioxide are conveniently used in conjunction with a tertiary base, e. g. pyridine, and the presence of an inert diluent such as chlorobenzene or carbon tetrachloride is advisable. Again anhydrides or halides of other polybasic acids can be used, for instance phosphorus pentoxide, phosphorus oxychloride, phosphorus trichloride, or methyl phosphoric acid dichloride, used for example in conjunction with a tertiary base such as pyridine.

The hydroxylated pyrazolone dyes which contain a hydroxyl group linked to an aryl radicle through an alkyl group can be made by coupling the appropriate diazo compounds with the appropriate pyrazolone coupling components in a manner analogous to that described above for the production of the acid esters but using, instead of the acid ester component, the hydroxylated component from which the acid ester component is derived. The said hydroxylated dyes are themselves capable of colouring cellulose ester or ether materials.

The dyes containing hydroxyalkyl groups, the hydroxy groups of which are esterified to acid esters of polybasic acids, can also be made by methods other than those outlined above. For example, a pyrazolone azo dye containing an atom or group which is convertible into or replaceable by a hydroxyalkyl group having the hydroxy group esterified to an acid ester with a polybasic acid can be treated so as to effect such conversion or replacement. For instance, an appropriate pyrazolone azo dye containing an amino group can be treated with a halogen-alkyl acid ester of sulphuric acid, phosphoric acid or the like. Again, an appropriate pyrazolone azo dye containing a replaceable halogen atom may be caused to react with an amino-alkyl acid ester of sulphuric acid, phosphoric acid or the like.

The invention includes the colouring of textile and other materials with dyes of the new class of acid ester dyes and the materials so coloured. Apart from cellulose acetate, other esters or ethers of cellulose which may be coloured are cellulose formate, propionate and butyrate and methyl, ethyl and benzyl cellulose. Again, wool, silk, and other animal fibers can be coloured, or mixed materials containing two or more types of fiber, e. g. both cellulose acetate and an animal fiber or both cellulose acetate and cotton or regenerated cellulose.

The dyes can be applied by bath methods. Again, they may be applied by printing, padding or other mechanical impregnation method. Fixation of dye applied by mechanical impregnation methods is readily effected by steaming or, in the case of cellulose ester or ether materials, either by steaming or with the assistance of a solvent or swelling agent for the material or by the two expedients, applied simultaneously or separately.

The invention is illustrated by the following examples:

*Example 1*

15.3 parts of p-(hydroxy-ethoxy)-aniline are dissolved in 100 parts of 96% sulphuric acid and the solution maintained at ordinary temperatures until examination of a test portion shows that esterification to the acid sulphuric ester is complete. The solution is then poured on to 1000 parts of crushed ice and diazotisation effected by running in a solution of 7 parts of sodium nitrite in 70 parts of water. When diazotisation is complete the diazo solution is allowed to run slowly into an alkyline solution of 17.4 parts of 1-phenyl-3-methyl-5-pyrazolone, alkalinity being maintained throughout the coupling process by simultaneous addition of sodium carbonate solution. When the reaction is complete the dyestuff is salted out, filtered, washed with a little cold water and dried.

*Example 2*

Para($\beta$-hydroxy-ethoxy)-benzene-azo-1-phenyl-3-methyl-5-pyrazolone is prepared by coupling diazotised 1-($\beta$-hydroxy-ethoxy)-4-amino-benzene with 1-phenyl-3-methyl-5-pyrazolone. 1 part of this dye is dissolved in 10 parts of cold concentrated sulphuric acid and allowed to stand for 12–15 hours. The solution is then poured on to ice and the dye filtered off and converted into its sodium salt. It dyes cellulose acetate in pure yellow shades.

A similar dye is obtained by acting on p-($\beta$-hydroxy-ethoxy)-benzene-azo-1-phenyl-3-methyl-5-pyrazolone with five times its weight of phosphorus trichloride, pouring on to water and ice and converting the product into its sodium salt.

*Example 3*

1-(p-hydroxy-ethoxy-phenyl)-3-methyl-5-pyrazolone, obtained by condensing p-(hydroxyethoxy)-phenyl hydrazine with acetoacetic ester, is coupled in the usual manner with benzene diazonium chloride, and the resulting dyestuff isolated by filtration and dried. It is now dissolved in the cold in ten times its weight of 96% sulphuric acid, left till sulphation is complete, and the solution poured on to ice. The precipitated dyestuff is filtered off, made into a paste with water, and converted into the sodium salt by addition of the requisite amount of caustic soda solution. The sodium salt of the benzene-azo-1-(p-sulphato-ethoxy-phenyl)-3-methyl-5-pyrazolone is filtered off, washed with a little water and dried.

*Example 4*

0.3 part of the sodium salt of p-($\beta$-sulphato-ethoxy)-benzene-azo-1-phenyl-3-methyl-5-pyrazolone are dissolved in 200 parts of water, and the temperature raised to 80° C. 10 parts of a well scoured cellulose acetate fabric are then entered and dyeing continued at this temperature for 1½ hours, during which time 5 parts of common salt are added in portions to assist exhaustion. The fabric is dyed a pure yellow shade.

Having described our invention what we desire to secure by Letters Patent is:

1. Process for the production of a new azo dye, which comprises esterifying to an acid ester of an inorganic polybasic acid an aryl-azo pyrazolone dye containing a hydroxyalkyl group and wherein the aryl is of the benzene series and the dye contains but one azo group.

2. Process for the production of a new azo dye, which comprises esterifying to an acid ester of sulphuric acid an aryl-azo pyrazolone dye wherein the aryl is of the benzene series and but one azo group is present, said dye containing a single hydroxy-alkoxy group and being free from sulphonic and carboxylic groups.

3. Process for the production of a new azo dye, which comprises esterifying to an acid ester of sulphuric acid a hydroxy-alkoxy benzene azo pyrazolone dye free from sulphonic and carboxylic groups.

4. Process for the production of a new azo dye, which comprises esterifying to an acid ester of sulphuric acid an aryl-azo-1-aryl-5-pyrazolone dye free from sulphonic and carboxylic groups and wherein the aryls are of the benzene series and one only of them contains a hydroxy-alkoxy group.

5. Process for the production of a new azo dye, which comprises esterifying to an acid ester of sulphuric acid the dye p-(hydroxy-alkoxy)-benzene-azo-1-phenyl-3-methyl-5-pyrazolone.

6. Process for the production of a new azo dye, which comprises esterifying to an acid ester of sulphuric acid the dye benzene-azo-1-(p-hydroxy-ethoxy-phenyl)-3-methyl-5-pyrazolone.

7. An aryl-azo pyrazolone dye, wherein the aryl is of the benzene series and but one azo group is present, said dye containing a hydroxyalkyl group, the hydroxyl group of which is esterified to an acid ester of an inorganic polybasic acid.

8. An aryl-azo pyrazolone dye, wherein the aryl is of the benzene series and but one azo group is present, said dye containing a hydroxyalkoxy group, the hydroxyl group of which is esterified to an acid ester of an inorganic polybasic acid.

9. An aryl-azo pyrazolone dye, wherein the aryl is of the benzene series and but one azo group is present, said dye containing a hydroxyalkyl group, the hydroxyl group of which is esterified to an acid ester of a polybasic inorganic acid and being free from sulphonic and carboxylic groups.

10. An aryl-azo pyrazolone dye, wherein the aryl is of the benzene series and but one azo group is present, said dye containing a hydroxyalkyl group, the hydroxyl group of which is esterified to an acid ester of sulphuric acid and being free from sulphonic and carboxylic groups.

11. An aryl-azo-1-aryl-5-pyrazolone dye free from sulphonic and carboxylic groups, and wherein the aryls are of the benzene series and one only of them contains a sulphato-alkoxy group.

12. An aryl-azo-1-aryl-3-methyl-5-pyrazolone dye free from sulphonic and carboxylic groups, and wherein the aryls are of the benzene series and one only of them contains a sulphato-alkoxy group.

13. p-Sulphato-alkoxy-benzene-azo-1-phenyl-3-methyl-5-pyrazolone.

14. Benzene-azo-1-(p-sulphato-alkoxy-phenyl)-3-methyl-5-pyrazolone.

15. Cellulose ester or ether materials coloured with a dye claimed in claim 9.

16. Cellulose acetate materials coloured with a dye claimed in claim 10.

GEORGE HOLLAND ELLIS.
HENRY CHARLES OLPIN.